US012621037B2

(12) United States Patent
Ozkoc et al.

(10) Patent No.: US 12,621,037 B2
(45) Date of Patent: May 5, 2026

(54) BEAM TRACKING WITH STATISTICAL LEARNING

(71) Applicant: Samsung Electronics Co., Ltd., Suwon-si (KR)

(72) Inventors: Mustafa Furkan Ozkoc, Plano, TX (US); Jianhua Mo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 18/365,089

(22) Filed: Aug. 3, 2023

(65) Prior Publication Data

US 2024/0063885 A1     Feb. 22, 2024

Related U.S. Application Data

(60) Provisional application No. 63/399,358, filed on Aug. 19, 2022.

(51) Int. Cl.
*H04B 7/06*        (2006.01)
*H04B 7/08*        (2006.01)

(52) U.S. Cl.
CPC ................................ *H04B 7/06952* (2023.05)

(58) Field of Classification Search
CPC ... H04B 7/06952; H04B 7/0695; H04B 7/088
See application file for complete search history.

(56) References Cited

U.S. PATENT DOCUMENTS

| | | | |
|---|---|---|---|
| 10,505,616 B1 | 12/2019 | Chen et al. | |
| 11,025,317 B2 | 6/2021 | Mo et al. | |
| 11,146,321 B2 | 10/2021 | Yoon et al. | |
| 11,316,574 B2 | 4/2022 | Nigam et al. | |
| 11,451,992 B2 | 9/2022 | Pezeshki et al. | |
| 11,638,263 B2 | 4/2023 | Ryu et al. | |
| 2020/0366340 A1 | 11/2020 | Zhang et al. | |
| 2021/0242928 A1* | 8/2021 | Park | G06N 3/092 |
| 2021/0307023 A1* | 9/2021 | He | H04W 72/25 |
| 2022/0038163 A1 | 2/2022 | Va et al. | |
| 2022/0070843 A1* | 3/2022 | Levitsky | H04B 7/06952 |
| 2023/0091614 A1 | 3/2023 | Zhou et al. | |

* cited by examiner

*Primary Examiner* — Harry H Kim

(57) ABSTRACT

A method includes obtaining information representing a current state of communication with a user equipment (UE) performed using one or more beams. The method also includes comparing the information to statistical historical state information to determine one or more best next narrow beam candidates. The method further includes performing a beam search using the one or more best next narrow beam candidates in order to select a next narrow beam. The method also includes communicating with the UE using the selected next narrow beam.

20 Claims, 15 Drawing Sheets

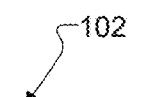
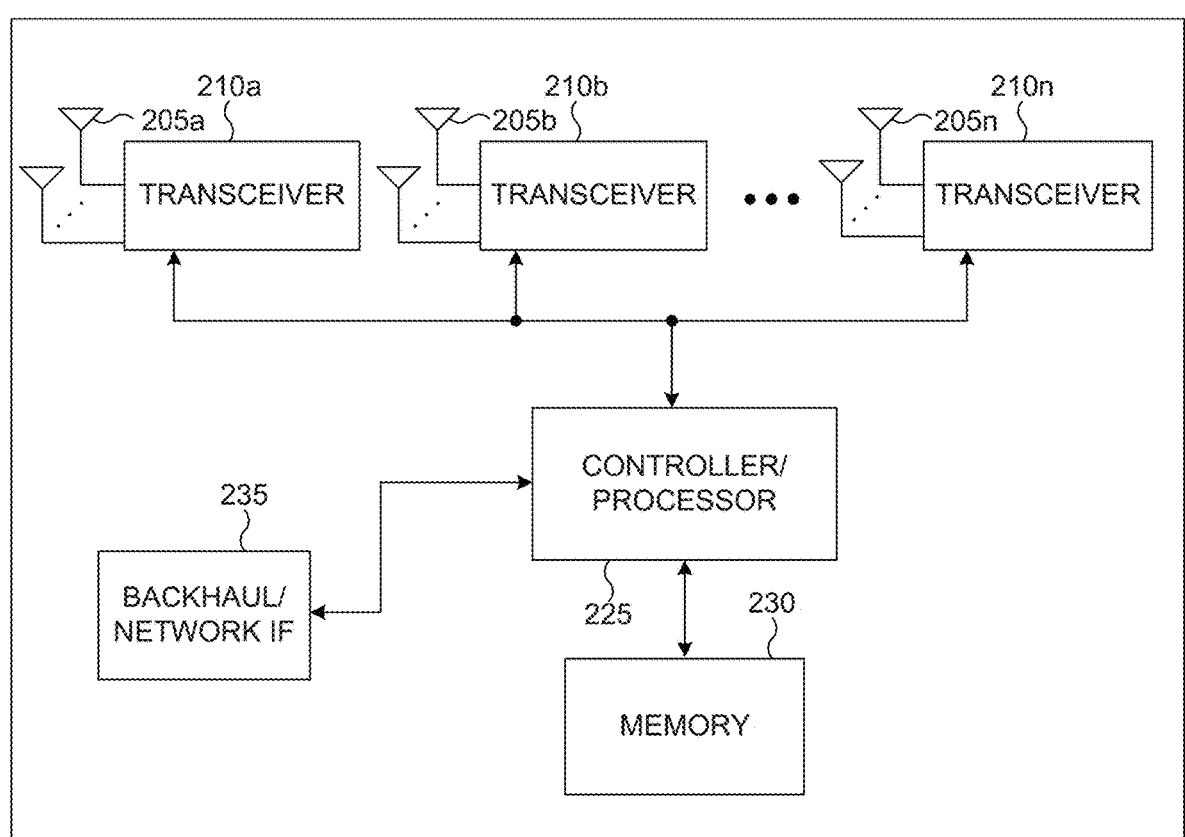
FIG. 2

900

| Current WB from last measurement (901) | Previous NB before current NB (902) | Current NB from last measurement (903) | Is RSRP of current NB increasing? (904) | Next Narrow Beam Candidate (905) | Observation Count (906) |
|---|---|---|---|---|---|
| 5 | 29 | 21 | YES | 29 | 197991 |
| 8 | 21 | 29 | YES | 21 | 169404 |
| 1 | 22 | 21 | YES | 22 | 163307 |
| 8 | 48 | 31 | NO | 30 | 111265 |
| 1 | 29 | 21 | NO | 29 | 103139 |
| 10 | 29 | 72 | YES | 29 | 101769 |
| : | : | : | : | : | : |
| 16 | 120 | 119 | YES | 108 | 1 |

| Current WB from last measurement (901) | Previous NB before current NB (902) | Current NB from last measurement (903) | Is RSRP of current NB increasing? (904) | Next Narrow Beam Candidate (905) | Observation Count (906) |
|---|---|---|---|---|---|
| 5 | 29 | 21 | YES | 29 | 197991 |
| 5 | 29 | 21 | YES | 39 | 39339 |
| 5 | 29 | 21 | YES | 38 | 11947 |
| 5 | 29 | 21 | YES | 22 | 5019 |
| 5 | 29 | 21 | YES | 47 | 1995 |
| 5 | 29 | 21 | YES | 72 | 671 |
| 5 | 29 | 21 | YES | 20 | 271 |
| 5 | 29 | 21 | YES | 33 | 210 |
| 5 | 29 | 21 | YES | 30 | 190 |
| 5 | 29 | 21 | YES | 25 | 6 |
| 5 | 29 | 21 | YES | 43 | 3 |
| 5 | 29 | 21 | YES | 32 | 1 |

1202 BS selects the beams for measurement

1210 UE measures the beams and report RSRP back to BS

1212 BS decides the beam for the data transmission

1214 BS records the RSRP report trace

1216 Time to update the table?

No

Yes

1218 BS updates the table

1204 Online UE RSRP report

1206 Latency and reliability requirement

1208 Beam prediction from table

1300

1302 BS selects the beams for measurement

1306 BS records the RSRP report trace

1304 The small table for online beam tracking

1308 Time to update the large table? No

Yes

1310 BS updates the large table to record the full statistics

1312 Time to update the small table? No

Yes

1314 BS updates the small table for online beam tracking based on the large table

BEAM TRACKING WITH STATISTICAL LEARNING

CROSS-REFERENCE TO RELATED APPLICATIONS AND CLAIM OF PRIORITY

The present application claims priority to U.S. Provisional Patent Application Ser. No. 63/399,358 filed on Aug. 19, 2022. The content of the above-identified patent document is incorporated herein by reference.

TECHNICAL FIELD

The present disclosure relates generally to wireless communication systems and, more specifically, the present disclosure relates to a system and method for beam tracking with statistical learning.

BACKGROUND

Beam management is an important and required procedure in mmWave frequencies. The mmWave beam codebook design is very important and challenging for 5G mmWave base stations. Different from the low frequency bands, beamforming is needed to support the high data transmission at the mmWave band due to the large mmWave band path-loss. A significant number of beams (e.g., more than 100 beams) may be needed to cover a wide angular region, for example, horizontally from –60 degrees to +60 degrees. On the other hand, many reference signals are needed to find out the best beam between the base station (BS) and the user equipment (UE).

SUMMARY

The present disclosure relates to wireless communication systems and, more specifically, the present disclosure relates to a system and method for beam tracking with statistical learning.

In one embodiment, a method includes obtaining information representing a current state of communication with a user equipment (UE) performed using one or more beams. The method also includes comparing the information to statistical historical state information to determine one or more best next narrow beam candidates. The method further includes performing a beam search using the one or more best next narrow beam candidates in order to select a next narrow beam. The method also includes communicating with the UE using the selected next narrow beam.

In another embodiment, a device includes a transceiver and a processor operably connected to the transceiver. The processor is configured to: obtain information representing a current state of communication with a UE performed using one or more beams; compare the information to statistical historical state information to determine one or more best next narrow beam candidates; perform a beam search using the one or more best next narrow beam candidates in order to select a next narrow beam; and communicate with the UE using the selected next narrow beam.

In yet another embodiment, a non-transitory computer readable medium includes program code that, when executed by a processor of a device, causes the device to: obtain information representing a current state of communication with a UE performed using one or more beams; compare the information to statistical historical state information to determine one or more best next narrow beam candidates; perform a beam search using the one or more best next narrow beam candidates in order to select a next narrow beam; and communicate with the UE using the selected next narrow beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates an example gNB according to embodiments of the present disclosure;

FIGS. 9A and 9B illustrate examples of data in a data table storing beam change statistics according to embodiments of the present disclosure;

DETAILED DESCRIPTION

Figure 1:
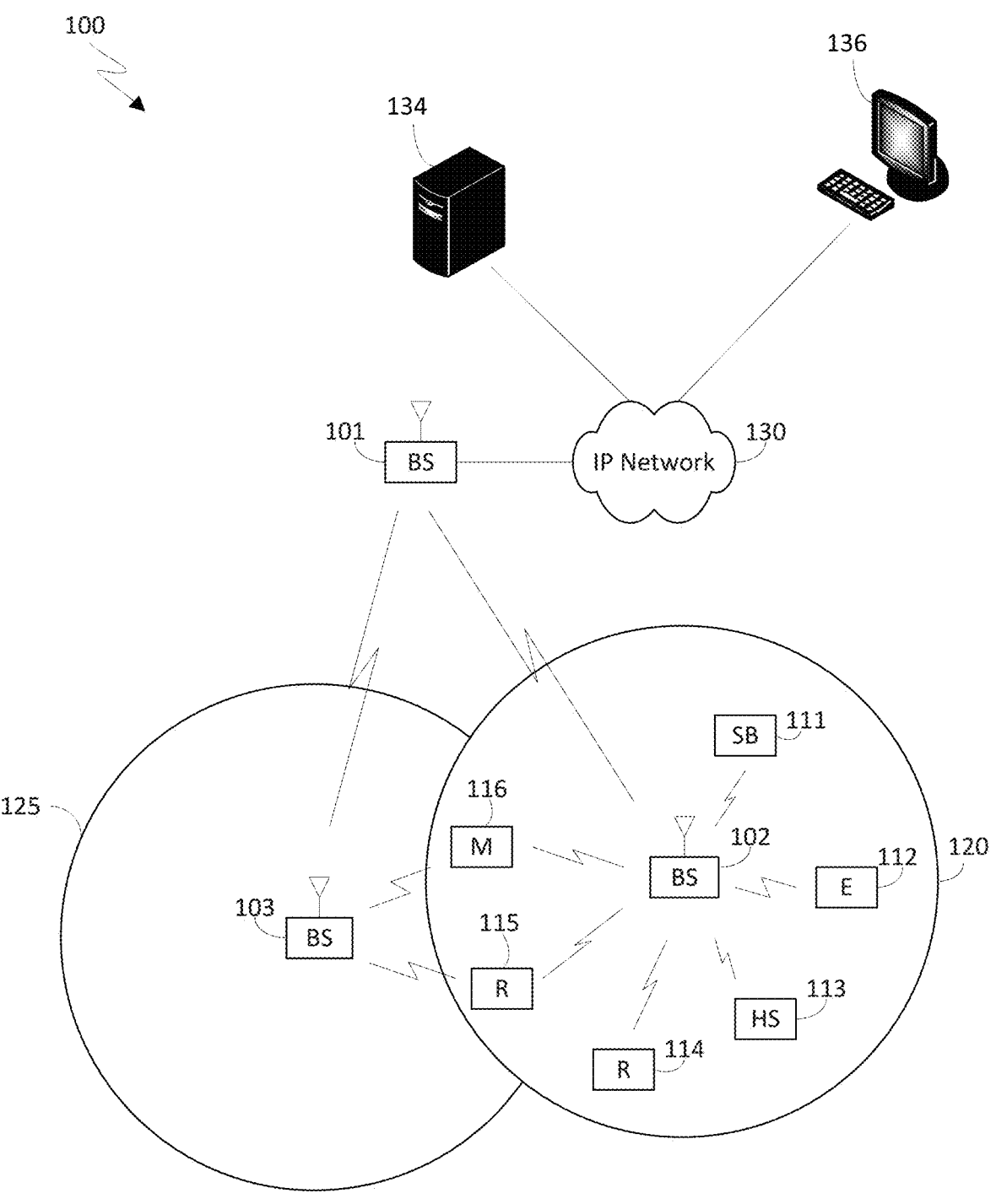
FIG. 1 illustrates an example wireless network according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 3:
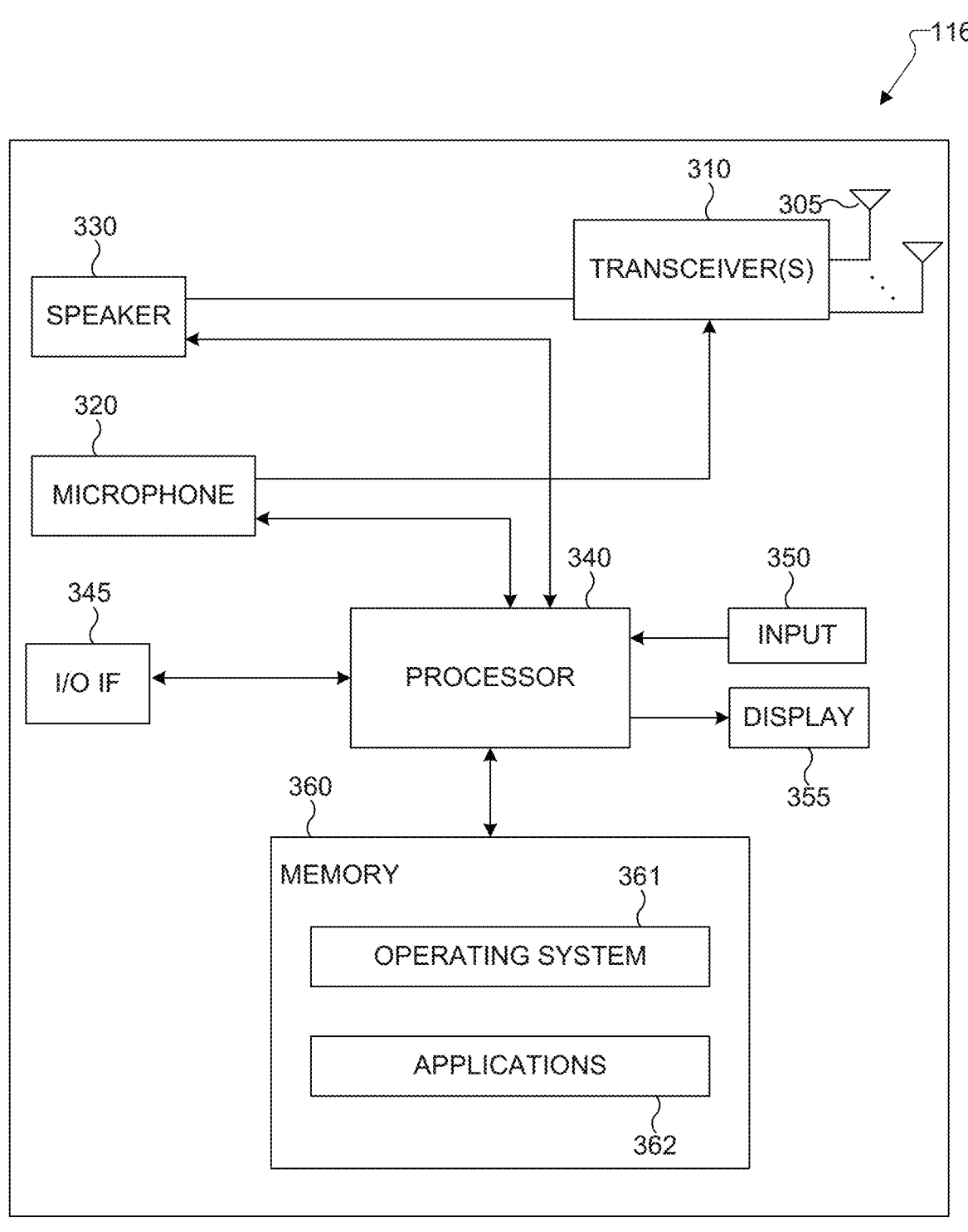
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

In some embodiments, the network 130 facilitates communications between at least one server 134 and various client devices, such as a client device 136. The server 134 includes any suitable computing or processing device that can provide computing services for one or more client devices. The server 134 could, for example, include one or more processing devices, one or more memories storing instructions and data, and one or more network interfaces facilitating communication over the network 130.

The client device 136 represents any suitable computing or processing device that interacts with at least one server or other computing device(s) over the network 130. In this example, the client device is represented as a desktop computer, but other examples of client devices can include a mobile telephone, laptop computer, or tablet computer. However, any other or additional client devices could be used in the wireless network 100.

In this example, client devices can communicate indirectly with the network 130. For example, some client devices can communicate via one or more base stations, such as cellular base stations or eNodeBs. Also, client devices can communicate via one or more wireless access points (not shown), such as IEEE 802.11 wireless access points. Note that these are for illustration only and that each client device 136 could communicate directly with the network 130 or indirectly with the network 130 via any suitable intermediate device(s) or network(s).

As described in more detail below, a computing device, such as the server 134 or the client device 136, may perform operations in connection with beam management. For example, the server 134 or the client device 136 may perform operations in connection with beam tracking with statistical learning as discussed herein.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam tracking with statistical learning as discussed herein. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for beam tracking with statistical learning. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 (which includes for example, a touchscreen, keypad, etc.) and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
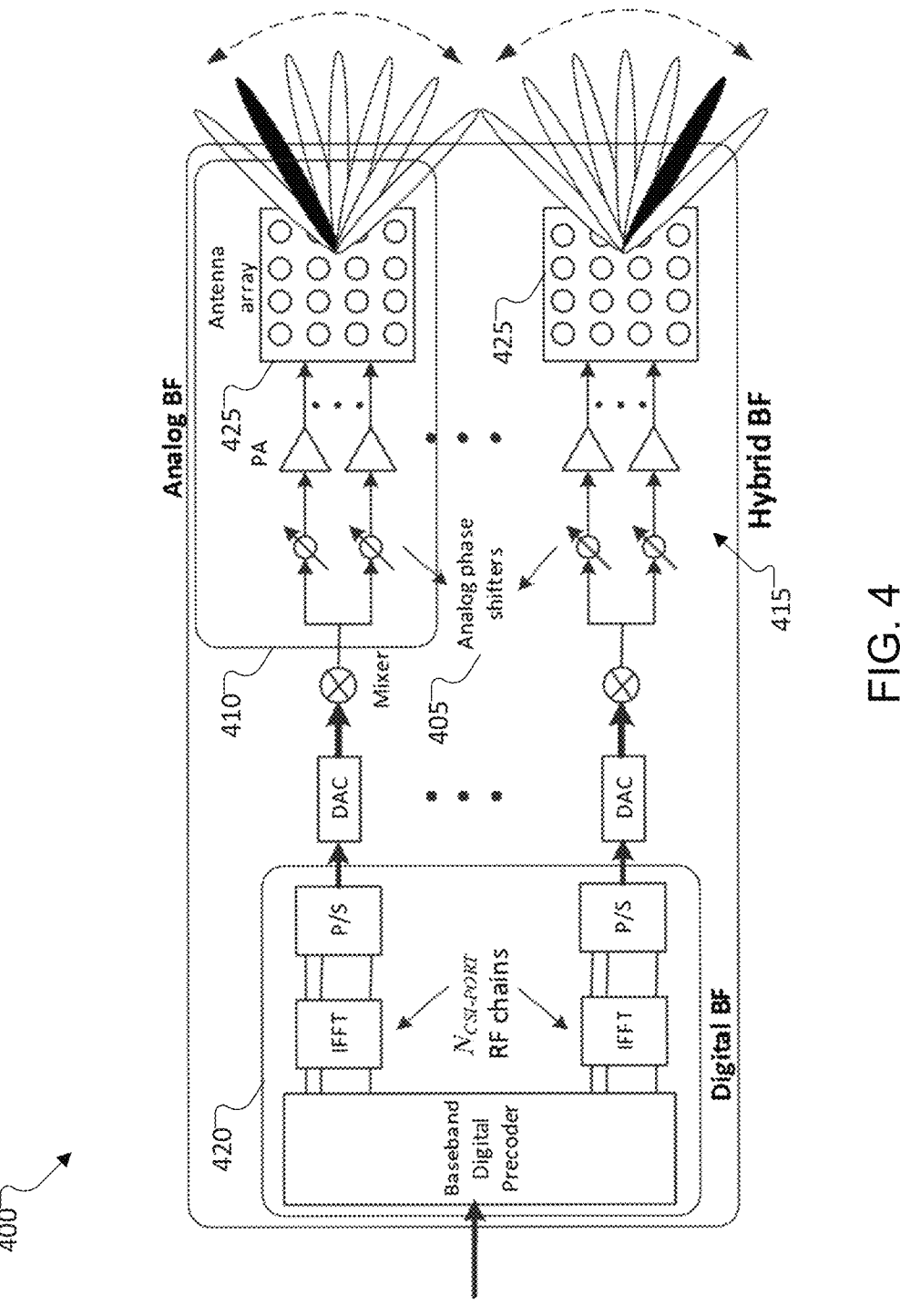
FIG. 4 illustrates an example beamforming architecture according to embodiments of the present disclosure.

FIG. 4 illustrates an example beamforming architecture 400 according to embodiments of the present disclosure. The embodiment of the beamforming architecture 400 illustrated in FIG. 4 is for illustration only. FIG. 4 does not limit the scope of this disclosure to any particular implementation of the beamforming architecture 400. In certain embodiments, one or more of gNB 102 or UE 116 can include the beamforming architecture 400. For example, one or more of antenna 205 and its associated systems or antenna 305 and its associated systems can be configured the same as or similar to the beamforming architecture 400.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 4, the beamforming architecture 400 includes analog phase shifters 405, an analog beamformer (BF) 410, a hybrid BF 415, a digital BF 420, and one or more antenna arrays 425. In this case, one CSI-RS port is mapped onto a large number of antenna elements in antenna arrays 425, which can be controlled by the bank of analog phase shifters 405. One CSI-RS port can then correspond to one sub-array which produces a narrow analog beam through analog beamforming by analog BF 410. The analog beam can be configured to sweep across a wider range of angles by varying the phase shifter bank 405 across symbols or subframes. The number of sub-arrays (equal to the number of RF chains) is the same as the number of CSI-RS ports NCSI-PORT. The digital BF 420 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 400 is also applicable to higher frequency bands such as >52.6 GHz (also termed the FR4). In this case, the beamforming architecture 400 can employ only analog beams. Due to the O2 absorption loss around 60 GHz frequency (~10 decibels (dB) additional loss @100 m distance), larger numbers of and sharper analog beams (hence larger number of radiators in the array) will be needed to compensate for the additional path loss.

As discussed above, beam management is an important and required procedure in mmWave frequencies. The mmWave beam codebook design is very important and challenging for 5G mmWave base stations. Different from the low frequency bands, beamforming is needed to support the high data transmission at the mmWave band due to the large mmWave band path-loss. A significant number of beams (e.g., more than 100 beams) may be needed to cover a wide angular region, for example, horizontally from −60 degrees to +60 degrees. On the other hand, many reference signals are needed to find out the best beam between the BS and the UE.

Figure 5:
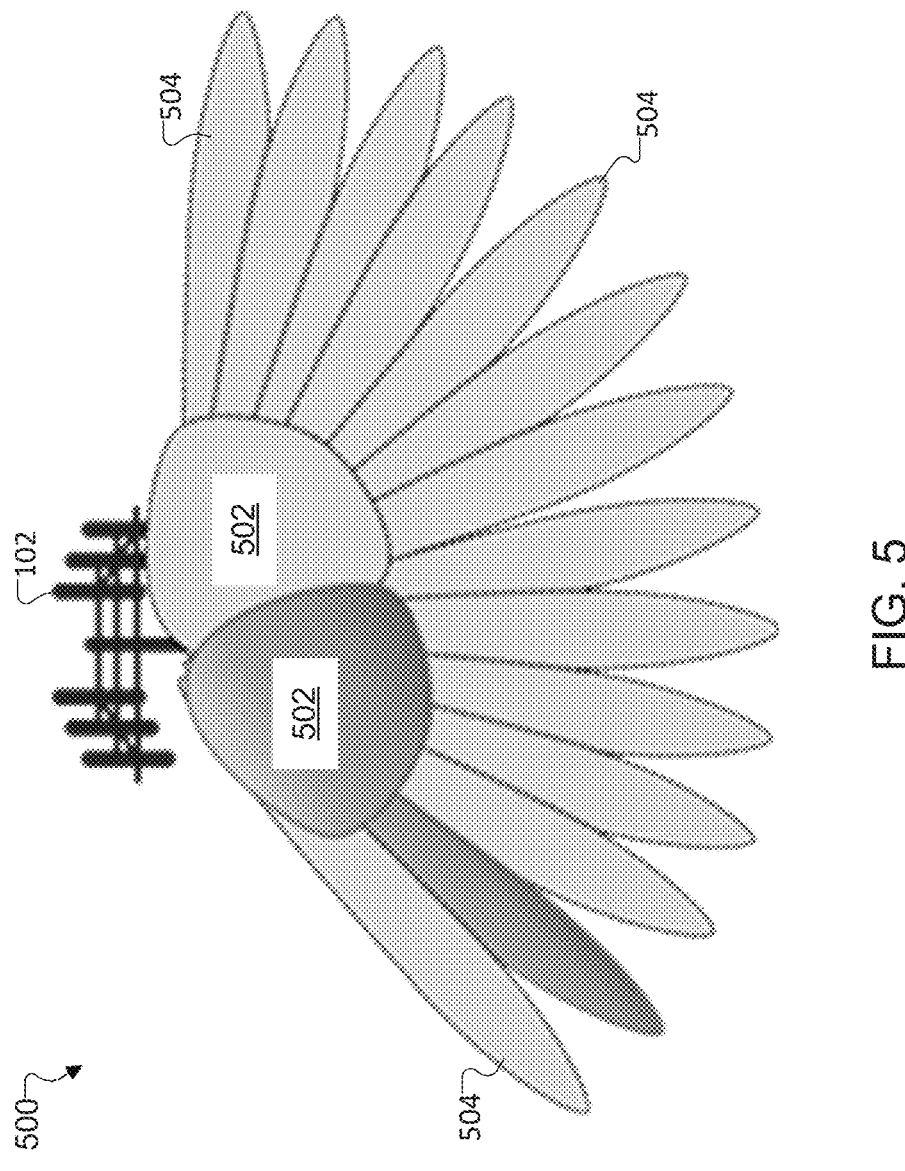
FIG. 5 illustrates an example of a composite beam transmission using a single antenna array according to embodiments of the present disclosure.

FIG. 5 illustrates an example of a composite beam transmission using a single antenna array 500 according to embodiments of the present disclosure. The antenna array 500 is for illustration only and other embodiments can be used without departing from the scope of the present disclosure.

As shown in FIG. 5, the antenna array 500 can be a component of, for example, the BS 102, and can transmit two wide beams 502 and fourteen narrow beams 504, where each wide beam 502 has seven children narrow beams 504. The example only shows the beam distribution in one dimension. In a hierarchical beam search, the two wide beams 502 are first transmitted by the BS 102 in order to identify the best wide beam 502. Then the BS 102 transmits the seven narrow beams 504 belonging to the best wide beam 502 to a UE (not shown). The UE measures the signal quality (e.g., RSRP, RSRQ, SNR, CQI, or the like) of the seven narrow beams 504 and feeds back to the BS 102. The narrow beam search is performed for each UE connected to the BS 102 and is performed periodically (e.g., every 80 ms) to track the UE movement or any change of propagation environment. The signaling overhead of narrow beam transmission is large if there is a large number of narrow beams. On the other side, if a subset of narrow beams is searched, there could be a performance loss if the true best narrow beam is not included in the search set.

Figure 6:
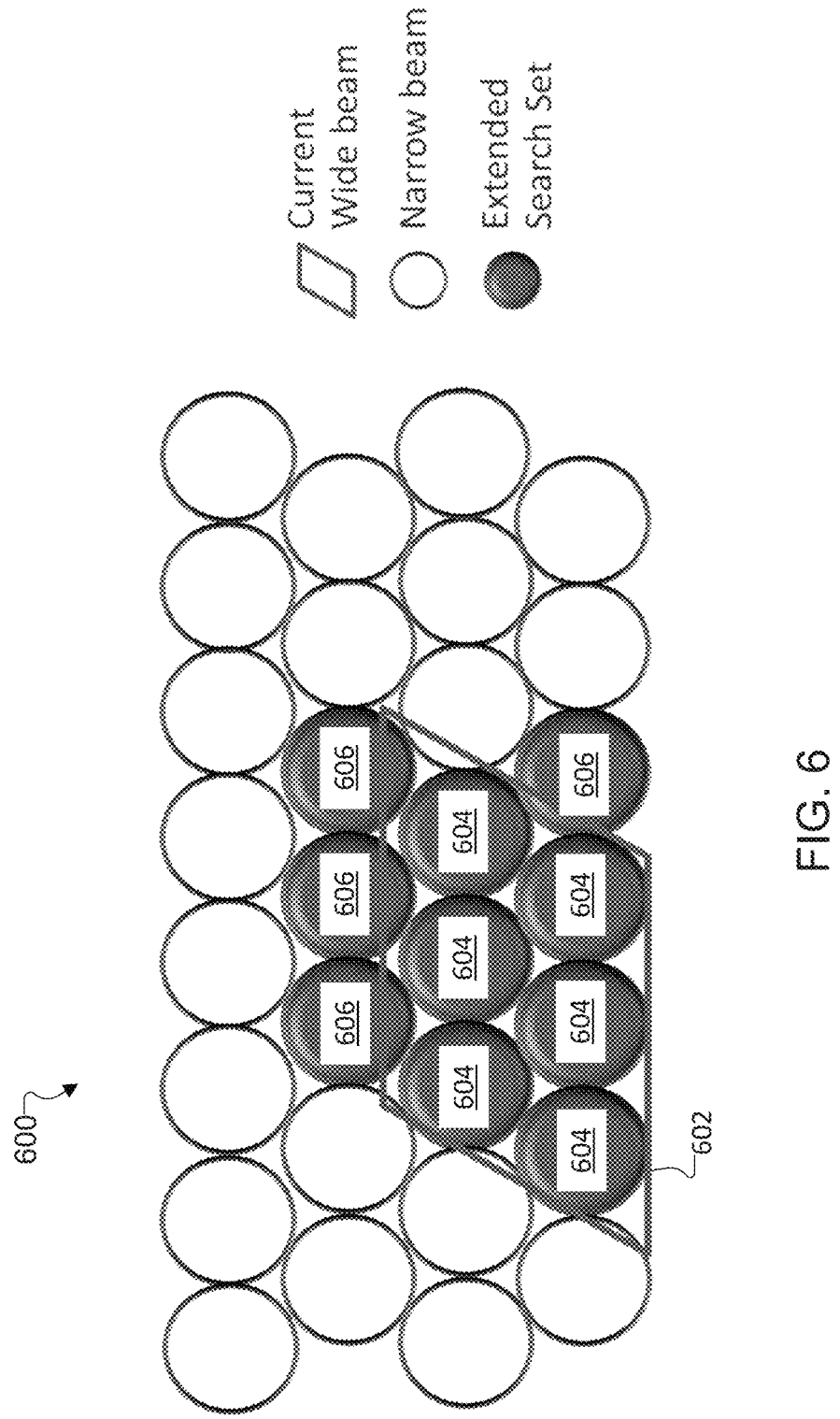
FIG. 6 illustrates an example of an extended search algorithm that can be performed as a hierarchical beam search according to embodiments of the present disclosure.

FIG. 6 illustrates an example of an extended search algorithm 600 that can be performed as a hierarchical beam search according to embodiments of the present disclosure. As shown in FIG. 6, a wide beam 602 (which can represent one of the wide beams 502 of FIG. 5) includes multiple child narrow beams 604 (which can represent some of the narrow beams 504 of FIG. 5). During the extended search algorithm 600, the BS transmits over K narrow beams for each wide beam 602. The K narrow beams include the child narrow beams 604 of the wide beam 602, and also includes one or more nearby narrow beams 606 that are adjacent to the child narrow beams 604. In FIG. 6, K is equal to 10 total narrow beams, including the six child narrow beams 604 and the four nearby narrow beams 606. Of course, other values for K are possible and within the scope of this disclosure. The nearby narrow beams 606 are determined by their overlap with the wide beam 602. This type of extended search algorithm 600 typically has a large measurement overhead. This can reduce overall system efficiency.

To address these and other issues, this disclosure provides systems and methods for beam tracking with statistical learning. The disclosed embodiments employ a low overhead beam tracking for mobile terminals. The disclosed embodiments learn site-specific information and the user trajectories to create search sets. The site-specific information is advantageous because, in real deployment, there can be both line-of-sight (LOS) and non-line-of-sight (NLOS) scenarios, irregular RSRP distribution and irregular beam patterns observed. The disclosed embodiments can learn and track UE movements and irregular beam changes in the sites. As a result, the disclosed embodiments provide multiple important advantages in beam tracking, including reduced beam management overhead, low computational complexity, robustness in both LOS and NLOS scenarios, and robustness to RSRP report quantization. In addition, the disclosed embodiments can be trained with existing baseline methods and surpass their accuracy.

Some of the embodiments discussed below are described in the context of mmWave bands. Of course, these are merely examples. It will be understood that the principles of this disclosure may be implemented in any number of other suitable contexts, systems, or frequency bands. It is also noted that although some examples describe measurements of RSRP, the UE measurements of the channel could be reference signal received quality (RSRQ), channel quality indicator (CQI), signal-to-noise-ratio (SNR), signal-to-interference-noise-ratio (SINR), and the like. The embodiments in this disclosure can be applied to those measurement metrics as well.

Figure 7:
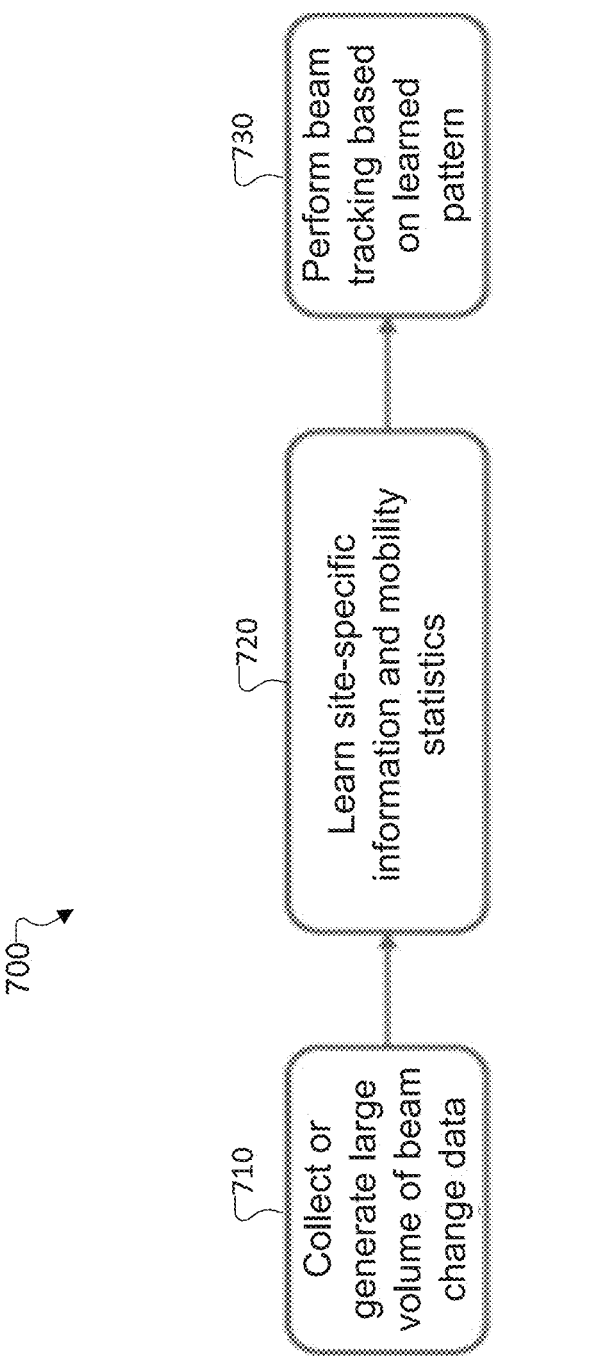
FIG. 7 illustrates an example process for beam tracking with statistical learning according to embodiments of the present disclosure.

FIG. 7 illustrates an example process 700 for beam tracking with statistical learning according to embodiments of the present disclosure. For ease of explanation, the process 700 will be described as implemented by the BS 102 of FIG. 1; however, the process 700 could be implemented by any other suitable device or system. The embodiment of the process 700 shown in FIG. 7 is for illustration only. Other embodiments of the process 700 could be used without departing from the scope of this disclosure.

As shown in FIG. 7, the process 700 starts with operation 710, during which the BS 102 collects or generates a large amount of beam change data over time. At operation 720, the BS 102 learns site-specific pattern information and mobility statistics. As an example of learning site-specific information and mobility statistics during operation 720, the BS 102 can acquire beam indices and/or RSRPs until time t–1 as input. The BS 102 then predicts the best beam index and/or RSRP at time t as output, where the beams are ordered based on their frequency of being the best beam or having the highest average RSRP. At operation 730, the BS performs beam tracking based on the learned pattern, which can relate to the most frequent next beams. Further details about each of these operations is provided below in conjunction with other figures.

Figure 8:
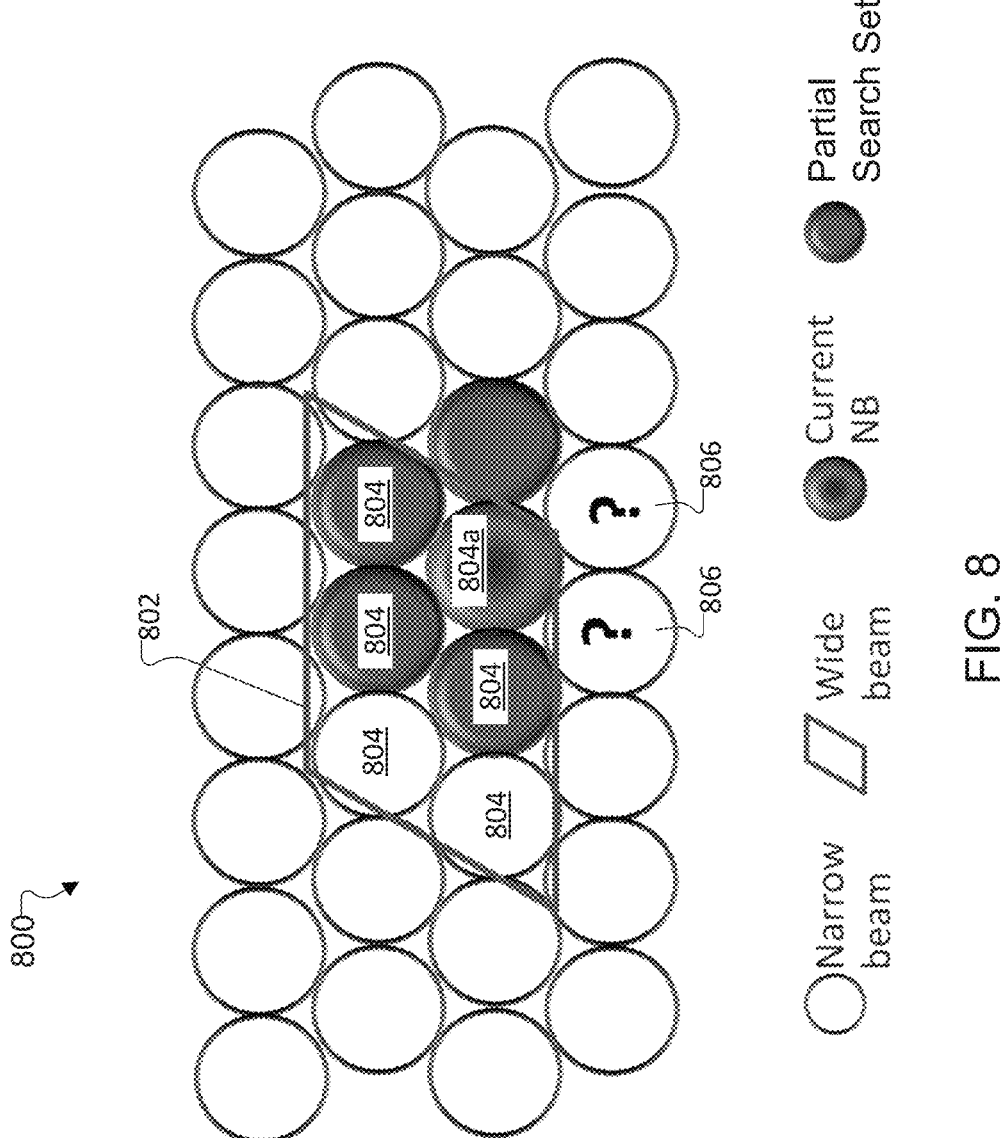
FIG. 8 illustrates an example beam pattern that shows the process of FIG. 7 according to embodiments of the present disclosure.

FIG. 8 illustrates an example beam pattern 800 that shows the process 700 according to embodiments of the present disclosure. As shown in FIG. 8, a wide beam 802 (which can represent one of the wide beams 502 of FIG. 5) includes multiple child narrow beams 804 (which can represent some of the narrow beams 504 of FIG. 5). The child narrow beams 804 include a currently used narrow beam 804*a*. During beam tracking, the BS 102 can select a subset of the child narrow beams 804 as a partial search set (identified by shading in FIG. 8). In addition to the child narrow beams 804 forming the partial search set, the BS 102 can use the learned site-specific pattern information and mobility statistics in order to determine (i.e., predict) one or more best next narrow beam candidates 806 for use in the beam search.
Table Generation.

In some embodiments, the BS 102 builds a table to record the beam change statistics generated in operations 710 and 720. The beam change statistics could include (but are not limited to) the narrow beam (NB) index history, the narrow beam RSRP history, the increasing or decreasing trend of narrow beam RSRP, the wide beam (WB) index history, the wide beam RSRP history, the increasing or decreasing trend of wide beam RSRP, the best narrow beam in the next time period, the best wide beam in the next time period, any other suitable beam related statistics, or a combination of two or more of these.

In some embodiments, the BS 102 could take the beam indexes and/or RSRPs until the time t–1 as the input, and refer to the table using the input in order to predict the best beam index and/or RSRP at time t as the output. Beams could be ordered in the table based on their frequency of being the best beam or having the highest average RSRP.

FIGS. 9A and 9B illustrate examples of data in a data table 900 storing beam change statistics according to embodiments of the present disclosure. In particular, FIG. 9A illustrates selected records in the data table 900 that show accumulated statistics, and FIG. 9B illustrates other records in the data table 900 that reflect a particular state of operation.

As shown in FIGS. 9A and 9B, the data table 900 includes a "Current wide band from last measurement" column 901, a "Previous narrow band before the current narrow band" column 902, a "Current narrow band from last measurement" column 903, an "Is RSRP of the current narrow band increasing?" column 904, a "Next narrow beam candidate" column 905, and an "Observation count" column 906. The values in the first four columns 901-904 correspond to the inputs of the table query (i.e., the "key" of the data table 900), and the value of "Next narrow beam candidate" column 905 is the output. The last column 906 tracks the counts of occurrence that the narrow beam index is the best beam in the beam change history. In other implementations, the input and output columns can be changed according to the desired outcome and available query information according to the statistics listed above or other available metrics.

During the recording or generation of the data table 900, all the available information on the state of the system can be recorded as input columns. For example, if the current state of the system is: {Current WB Index: 7, Previous NB Index: 62, Current NB Index: 63, RSRP increasing?: Yes, next NB Index: 62}, and that particular state has not previously been recorded in the data table 900, then a new data record corresponding to that system state can be recorded in the data table 900. Alternatively, if that particular state has already been recorded in the data table 900, then the "Observation count" column 906 for that record can be incremented by one to reflect the current observation of the current state.

FIG. 9B illustrates multiple records of the data table 900 for one particular state of the system observed over time. In FIG. 9B, all rows of the data table 900 are for the state corresponding to {Current WB Index: 5, Previous NB Index: 29, Current NB Index: 21, RSRP increasing?: Yes}. Over time, that particular state has been associated with multiple next narrow beams, as shown in column 905. For example, over the beam tracking history, for that particular state, it has been observed 197,991 times that the best next narrow beam is 29. Likewise, for that particular state, it has been observed 39,339 times that the best next narrow beam is 39. Other observed best next narrow beams for that particular state include 38, 22, 47, 72, 20, 33, 30, 25, 43, and 32. As shown in FIG. 9B, the narrow beam index 32 has only be observed one time as the best next narrow beam over the beam tracking history reflected in the data table 900.

In some embodiments, some of the recorded columns 901-906 of the data table 900 could be aggregated according to the desired information resolution. For example, the "Is RSRP of the current narrow band increasing?" column 904 can be recorded with either "YES" or "NO" for each record (based on the current observation). However, during use, in one implementation, this input can be ignored and the observation frequency of the two states representing increasing RSRP ("YES") and decreasing RSRP ("NO") can be aggregated. This way, the data table 900 can be adapted to be as comprehensive as desired or can be converted to only use a subset of inputs.

Figure 10:
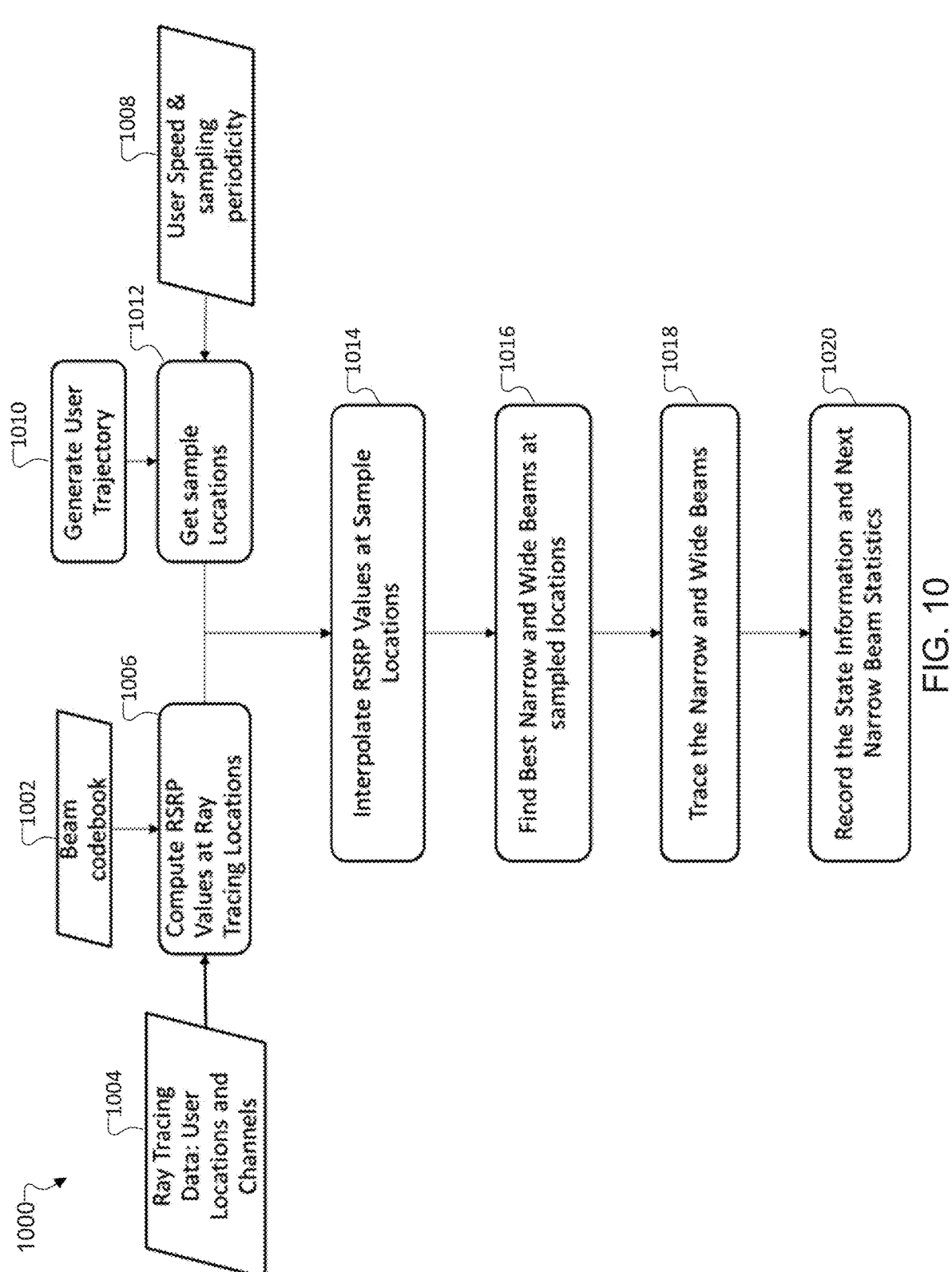
FIG. 10 illustrates an example offline ray tracing-based table generation process according to embodiments of the present disclosure.

In some embodiments, the beam change data comprising the data table 900 could be generated offline and/or online. According to one option, the data table 900 could be created based on an offline simulation of UE movement and ray tracing channel. FIG. 10 illustrates an example offline ray tracing-based table generation process 1000 according to embodiments of the present disclosure.

As shown in FIG. 10, using the targeted beamforming codebook 1002 and ray tracing data 1004, the RSRP values of the ray tracing locations can be computed at operation 1006. User speed and sampling periodicity 1008 and a generated user trajectory 1010 can be used to determine measurement sample locations at operation 1012. The sample locations and ray tracing locations are likely to not match exactly but the RSRP values at the sample locations can be obtained through an interpolation operation 1014. Once the RSRP values are obtained, the best narrow beam and wide beams can be identified for each sample location at operation 1016. The best narrow beam can be traced as the user moves along its trajectory at operation 1018. Every time a change in the best narrow beam is observed, the system state information and the new best narrow beam could be recorded into the statistics table at operation 1020. For example, when the best NB index changed from 21 to 29, one can look into prior sample locations and obtain the best WB, the best NB, the best previous NB, and an indication if the RSRP is increasing and decreasing. Once the state information is determined from prior samples, the next NB 29 can be recorded into the data table 900 by increasing the value of the "Observation Count" column 906 by one for the corresponding state: {Current WB Index: 5, Previous NB Index: 29, Current NB Index: 21, RSRP increasing?: Yes, next NB candidate: 29}.

According to a second option, the data table 900 could be generated based on the online data of the UE RSRP report. The BS 102 could apply a full children narrow beam search at the beginning of its deployment, and build the data table 900 accordingly. As a third option, the data table 900 could be first generated by simulation offline and then refined online based on the UE RSRP feedback. The BS 102 could select a portion of UEs and do a full children narrow beam sweeping for the selected UEs, while doing partial search for the other UEs.

In some embodiments, the BS 102 could train the data table 900 in non-real time. In one option, the BS 102 could record the UE RSRP report and update the data table 900 during one or more light traffic times (for example, during night time) to reduce the online training burden. In another option, if there is a constraint on the computational complexity, the BS 102 could send the UE report to a server (e.g., the server 134) to update the data table 900, and later download the updated data table 900 from the server.

In some embodiments, the data table 900 could be site-specific. For example, every BS 102 could build a data table 900 based on the RSRP report from the UEs connected to that BS 102. The site-specific propagation pattern and mobility pattern are automatically learned by the table-based method. In other embodiments, the data table 900 could be shared between BSs if there are similar propagation environments. For example, for a BS in a rural area, the propagation environment is more or less the same, and the data table 900 can be trained by aggregating the data from multiple BSs.

In some embodiments, a data table 900 could be built for a class of deployment scenarios, which have different propagation and/or mobility patterns. For example, the candidate scenarios could include (i) a data table 900 for a dense urban area with high-rise buildings, (ii) a data table 900 for urban areas with a perpendicular (i.e., grid-like) street layout, (iii) a data table 900 for rural areas with mostly LOS channels, or any other suitable scenarios. The scenario specific data table 900 could be used as a starting point, and as more site-specific information is learned, the data table 900 can be updated.

In some embodiments, if there is a trained table at a nearby BS 102, a new BS 102 could adopt the trained table as the starting point and then update it online. In other embodiments, a default table could be adopted by the BS 102 if there is no prior information of the deployment location and scenarios. The default table could be trained for a pure-LOS channel and random UE movement.

In some embodiments, the data table 900 could be time-variant. As the propagation environment changes or UE mobility pattern changes (e.g., when a new road or a new building is constructed), the statistics of the UE RSRP report changes, and the data table 900 can be automatically updated accordingly. In some embodiments, multiple data tables 900 could be used for different traffic and mobility patterns observed in a site. Examples of such table groups may include weekday and weekend tables, or tables for morning, afternoon, and evening hours.

Figure 11:
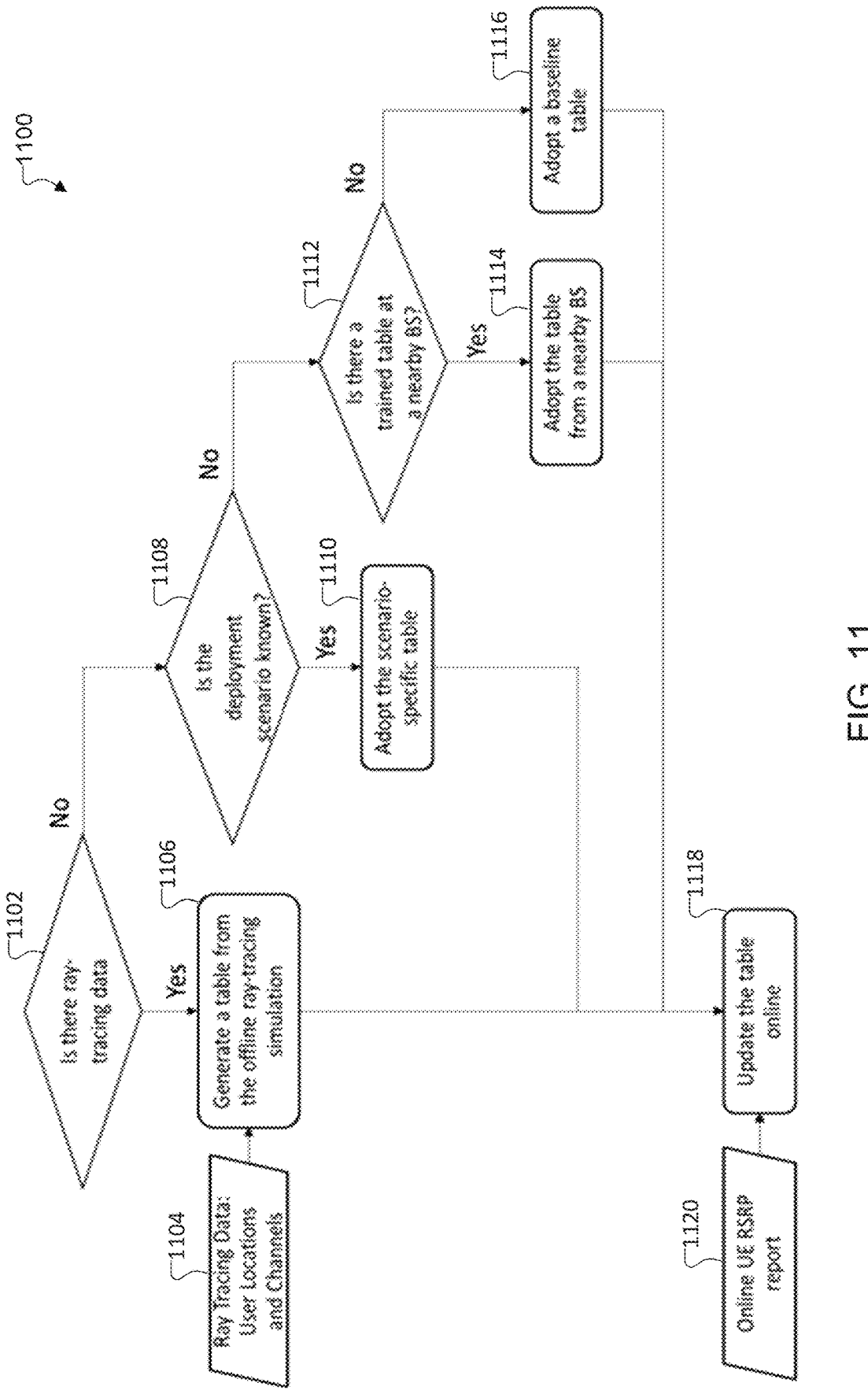
FIG. 11 illustrates another example ray tracing-based table generation process according to embodiments of the present disclosure.

FIG. 11 illustrates another example ray tracing-based table generation process 1100 according to embodiments of the present disclosure. At operation 1102, the BS 102 checks if there is ray-tracing data 1104 for the installation location. If yes, then at operation 1106, the BS 102 generates a table from the offline ray-tracing simulation. Otherwise, at operation 1108, the BS 102 checks if the deployment scenario is known. If yes, then at operation 1110, the BS 102 adopts a table for the specific scenario. Otherwise, at operation 1112, the BS 102 checks if there is a trained table at a nearby BS. If yes, then at operation 1114, the BS 102 can reuse the trained table. Otherwise, at operation 1116, the BS 102 adopts a baseline table. After the initialization, at operation 1118, the BS 102 can refine the table online based on the UE RSRP report 1120.

Online Beam Tracking.

In some embodiments, the BS 102 could determine a set of beams for beam sweeping based on the data table 900. In one option, the BS 102 could order the candidate beams based on their chances of being the best beam or the predicted RSRP values. The BS 102 selects the top-k beams with highest probability or highest RSRPs. In a second option, the BS 102 could order the beams based on the upper confidence bound of RSRP, which is defined as:

$$RSRP_t(i) + c\sqrt{\frac{\log t}{N_t(i)}}$$

where $RSRP_t(i)$ is the estimated RSRP of the i-th beam at time step t, $N_t(i)$ is the number of times that the i-th beam has been selected, prior to time t, and c is a confidence value that controls the level of exploration. In a third option, the BS 102 could order the beams based on the upper confidence bound of probability, which is defined similar to the RSRP case.

In some embodiments, the previous narrow beam and the current narrow beam could always be included in the search set. By doing so, the BS 102 can handle any "ping-pong" effect of the beam change.

In some embodiments, the BS 102 could select a varying number of beams for sweeping. As one option, BS 102 could select the beams whose probability of being the best is above a threshold, for example, 10%. As another option, the BS 102 could select the beams whose predicted RSRP is above a threshold, for example, ~90 dBm. As a third option, the BS 102 could select the beams whose sum probability of being the best is above a threshold, for example, 90%. In other words, this is the set of beams whose aggregate observation count is greater than 90% of the total number of observations for that system state. As a fourth option, the BS 102 could determine the BS size based on the RSRP level. If the RSRP level of the narrow beam is relatively high, the BS 102 could select a smaller set of beams. Otherwise, more beams are selected for sweeping. As a fifth option, the BS 102 could determine the beam sweeping size based on the traffic load of the whole cell. If there are only a few UEs in the cell and the beam sweeping overhead is not a concern, the BS 102 could sweep more beams predicted by the data table 900. Otherwise, fewer beams are selected.

In some embodiments, the table methods disclosed above can be application dependent. For example, if the application reliability requirement is high, a data table search that includes more NBs can be used (i.e., increasing the value of K). In other embodiments, if system latency is high priority and the time spent during beam tracking might jeopardize the latency of the system, a data table search that only searches one beam according to the highest likely beam statistics can be used. For other applications, different data tables can be created.

Figure 12:
FIG. 12 illustrates an example process for online beam tracking and table update according to embodiments of the present disclosure.

FIG. 12 illustrates an example process 1200 for online beam tracking and table update according to embodiments of the present disclosure. As shown in FIG. 12, at operation 1202, the BS 102 periodically selects the beam(s) for measurement based on the online UE RSRP report 1204, the latency and/or reliability requirement 1206, the beam prediction 1208 from the table, or a combination of two or more of these. Then, at operation 1210, the UE measures the beams and reports the RSRPs back to the BS 102. At operation 1212, the BS 102 decides the beam for the data transmission based on the report. Usually, the best beam from the report is used for the data transmission if there is no interference consideration. Next, at operation 1214, the BS 102 records the RSRP report trace, and, at operation 1216, the BS 102 checks if there is a need to update the table. If yes, then at operation 1218, the BS 102 updates the table based on the RSRP report trace.

In some embodiments, the data table used to record the statistics and the data table used for online beam tracking could be different. In one option, the BS 102 could record the full statistics with a large table, and build a smaller table which only contains the indexes of the most likely next beams. In some BS implementations, a smaller table size could be desired due to one or more restrictions, including (but not limited to) storage limitations and limited computational capabilities. The BS 102 could reduce the size of the table and/or store the table in a data structure that allows a fast look-up operation.

Figure 13:
FIG. 13 illustrates an example process for online beam tracking and table update with two tables according to embodiments of the present disclosure.

FIG. 13 illustrates an example process 1300 for online beam tracking and table update with two tables according to embodiments of the present disclosure. Using the process 1300, the BS 102 could update the two tables (a large table and a small table) at different times. The large table could be updated more frequently to record the full statistics, while the small online tracking table could be updated less frequently. As shown in FIG. 13, at operation 1302, the BS 102 periodically selects the beam(s) for measurement based on the small table 1304. At operation 1306, the BS 102 records the RSRP report trace. At operation 1308, the BS 102 determines if it is time to update the large table. If so, then at operation 1310, the BS 102 updates the large table to record the full statistics. At operation 1312, the BS 102 determines if it is time to update the small table. If so, then at operation 1314, the BS 102 updates the small table based on the data in the large table.

In some embodiments, a technique for reducing the table size could be only keeping the top K most frequent next NB entries and removing all other entries. This way even if more than K next NB entries are observed, only top K would be stored at the BSs.

Figure 14:
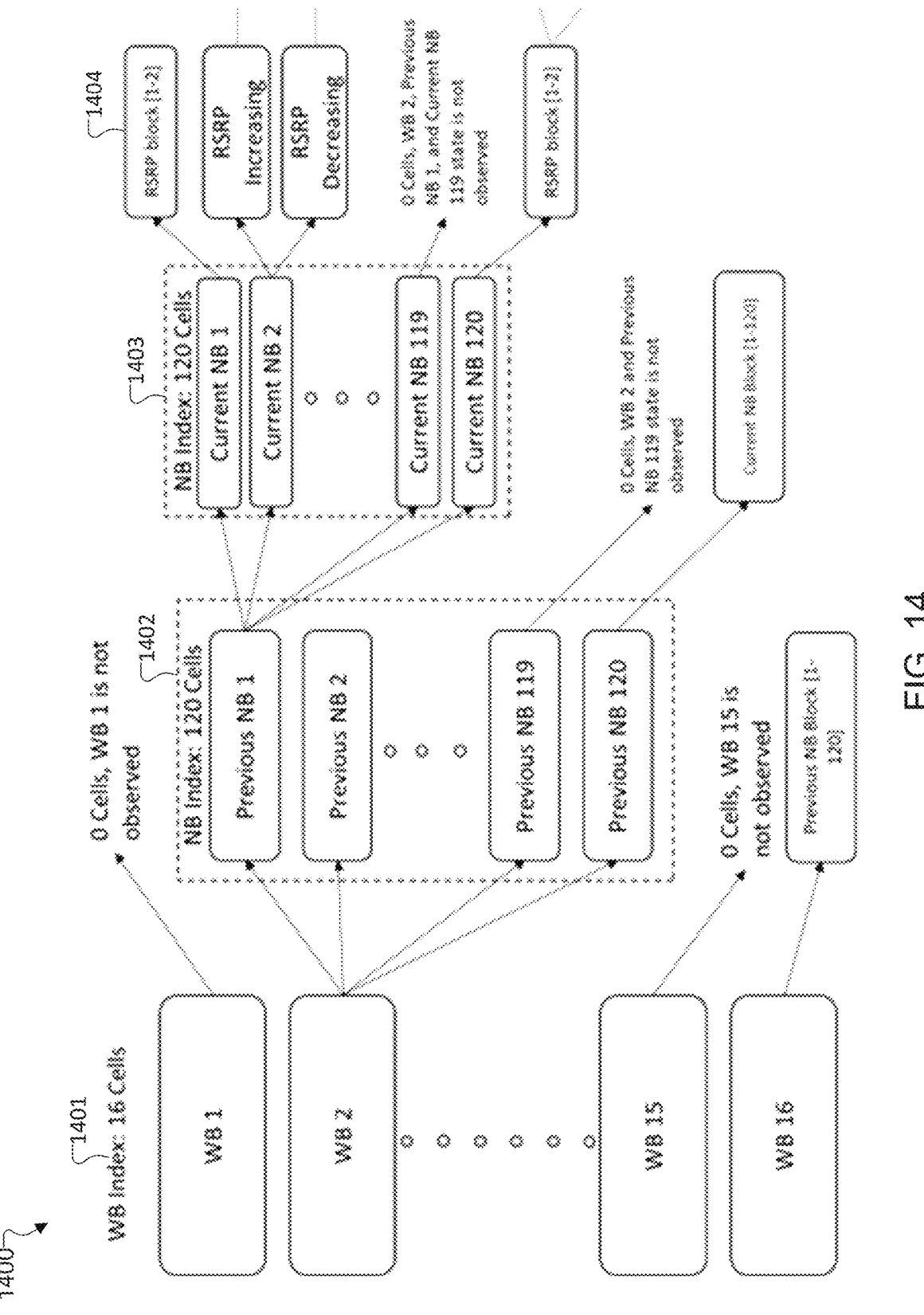
FIG. 14 illustrates an example data structure having cascaded cells in a multi-dimensional cell array according to embodiments of the present disclosure.

In some embodiments, a technique for reducing the computational complexity would be storing the data table 900 in a fast lookup data structure. One such structure could be storing the best K beams that would be used for search in a cell array. Each of these cells could be addressed by the state information that are used for the lookup. One example could be a multi-dimensional cell array. FIG. 14 illustrates an example data structure 1400 having cascaded cells in a multi-dimensional cell array according to embodiments of the present disclosure.

As shown in FIG. 14, the current WB index 1401, the previous NB index 1402, the current NB index 1403, and the increasing or decreasing trend of the current NB RSRP 1404 could address the search set. In this particular implementation, the cell array would have dimensions of [#WBs*#NBs*#NBs*2], where each cell is the search set array of size K or less. In the data structure 1400, the table can be stored as cascaded cells. For example, for each WB, there could be a different cell. Then within the WB cell, for each previous NB index there could be a different cell. Within these previous NB cells, there could be cells for each current NB. Within these current NB cells, there could be two cells for increasing and decreasing RSRP value. Finally, each of these cells could hold the corresponding search set.

Another example of fast lookup structure could be storing the table as a hash map where the state information is hashed and can point to the search set. Two states could be hashed to the same value, and this should be taken care of by additional steps.

Although FIGS. 6 through 14 illustrate various processes and details related to beam tracking with statistical learning, various changes may be made to FIGS. 6 through 14. For example, various components in FIGS. 6 through 14 could be combined, further subdivided, or omitted and additional components could be added according to particular needs. In addition, various operations in FIGS. 6 through 14 could overlap, occur in parallel, occur in a different order, or occur any number of times.

Figure 15:
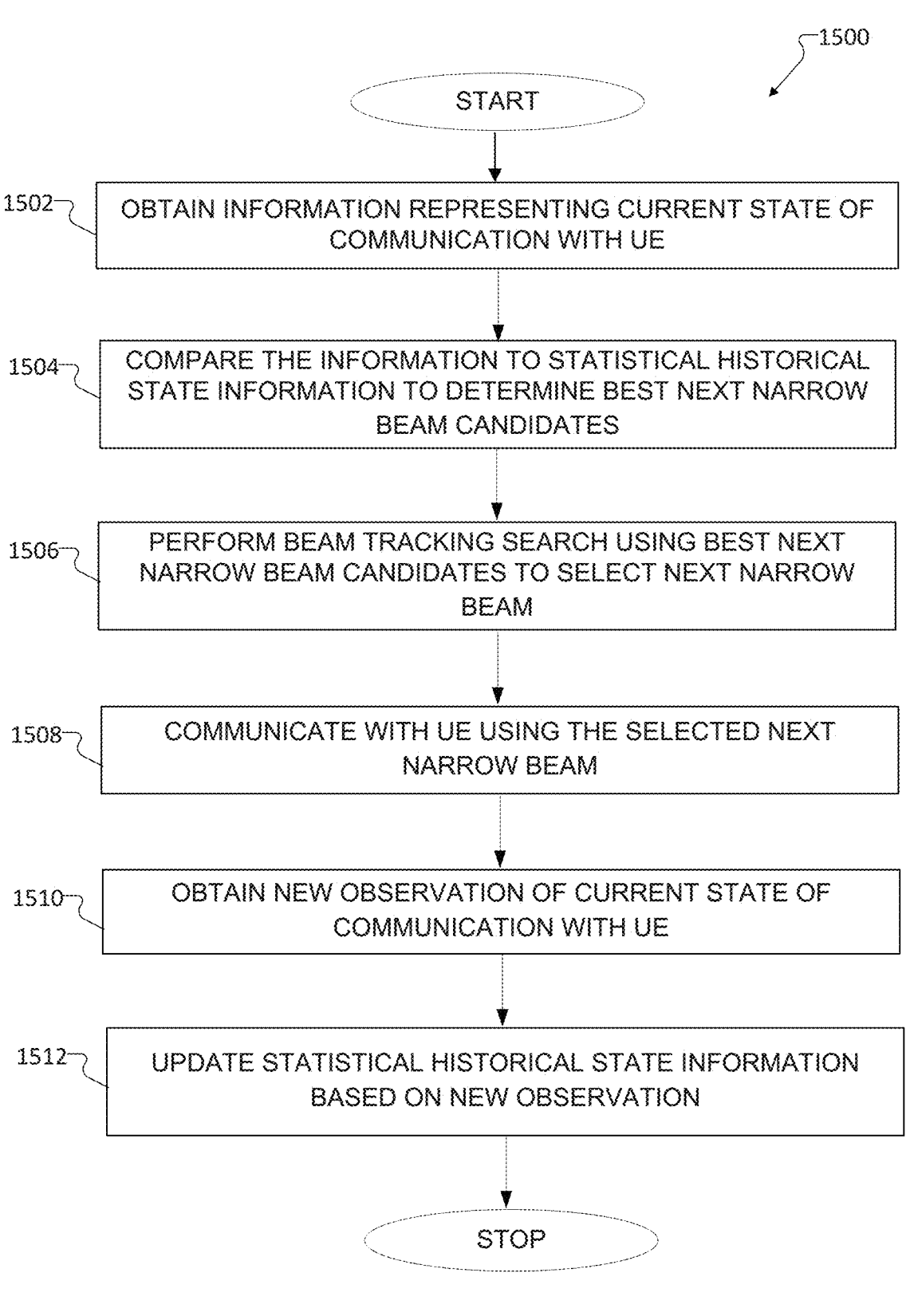
FIG. 15 illustrates a method for beam tracking with statistical learning according to embodiments of the present disclosure.

FIG. 15 illustrates a method 1500 for beam tracking with statistical learning according to embodiments of the present disclosure, as may be performed by one or more components of the network 100 (e.g., the BS 102). The embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, the method 1500 begins at step 1502. At step 1502, information is obtained that represents a current state of communication with a UE performed using one or more beams. This could include, for example, the BS 102 obtaining information representing a current state of communication with a UE performed using one or more beams, such as shown in FIGS. 4 and 5. The information of the current state can include, for example, a previous NB index, a current NB index, a current WB index, and an indicator of whether the RSRP of the current NB is increasing.

At step 1504, the information is compared to statistical historical state information to determine one or more best next narrow beam candidates. This could include, for example, the BS 102 comparing the current state information to statistical historical state information stored in the data table 900, in order to determine one or more best next narrow beam candidates, such as shown in the "Next narrow beam candidate" column 905. The one or more best next narrow beam candidates can include, for example, a most frequent next narrow beam candidate (i.e., highest observation count), a predetermined quantity of next narrow beam candidates (e.g., the top three next narrow beam candidates), or multiple next narrow beam candidates having an accumulated probability that is equal to or greater than a threshold probability value.

At step 1506, a beam search is performed using the one or more best next narrow beam candidates in order to select a next narrow beam. This could include, for example, the BS 102 performing a beam search using one or more best next narrow beam candidates shown in the "Next narrow beam candidate" column 905 in order to select a next narrow beam.

At step 1508, the BS communicates with the UE using the selected next narrow beam. This could include, for example, the BS 102 communicating with the UE using the selected next narrow beam.

At step 1510, a new observation of the current state of communication is obtained in response to communicating with the UE using the selected next narrow beam. This could include, for example, the BS 102 obtaining a new observation of the current state of communication.

At step 1512, the statistical historical state information is updated based on the new observation. This could include, for example, the BS 102 updating the data table 900 based on the new observation. In particular, the BS 102 could add a new data record to the data table 900 or update an observation count of an existing record of the data table 900.

Although FIG. 15 illustrates one example of a method 1500 for beam tracking with statistical learning, various changes may be made to FIG. 15. For example, while shown as a series of steps, various steps in FIG. 15 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
    obtaining information representing a current state of communication with a user equipment (UE) performed using one or more beams;
    comparing the information to statistical historical state information to determine one or more best next narrow beam candidates;
    performing a beam search using the one or more best next narrow beam candidates in order to select a next narrow beam; and
    communicating with the UE using the selected next narrow beam,
    wherein the statistical historical state information comprises a current wide beam, a current narrow beam, and a previous narrow beam before the current narrow beam.

2. The method of claim 1, wherein the statistical historical state information further comprises a reference signal received power (RSRP) change indicator.

3. The method of claim 2, wherein the RSRP change indicator indicates whether or not a RSRP of the current narrow beam is increasing.

4. The method of claim 2, wherein the statistical historical state information further comprises:

multiple next narrow beam candidates; and
    an observation count corresponding to each of the multiple next narrow beam candidates.

5. The method of claim 1, further comprising:
    obtaining a new observation of the current state of communication in response to communicating with the UE using the selected next narrow beam; and
    updating the statistical historical state information based on the new observation.

6. The method of claim 5, wherein updating the statistical historical state information based on the new observation comprises at least one of:
    adding a new data record to the statistical historical state information; and
    updating an observation count of an existing record of the statistical historical state information.

7. The method of claim 1, wherein the one or more best next narrow beam candidates comprise one of:
    a most frequent next narrow beam candidate;
    a predetermined quantity of next narrow beam candidates; and
    multiple next narrow beam candidates having an accumulated probability that is equal to or greater than a threshold probability value.

8. A device comprising:
    a transceiver; and
    a processor operably connected to the transceiver, the processor configured to:
        obtain information representing a current state of communication with a user equipment (UE) performed using one or more beams;
        compare the information to statistical historical state information to determine one or more best next narrow beam candidates;
        perform a beam search using the one or more best next narrow beam candidates in order to select a next narrow beam; and
        communicate with the UE using the selected next narrow beam,
    wherein the statistical historical state information comprises (i) multiple next narrow beam candidates, and (ii) an observation count corresponding to each of the multiple next narrow beam candidates.

9. The device of claim 8, wherein the statistical historical state information further comprises a current wide beam, a current narrow beam, a previous narrow beam before the current narrow beam, and a reference signal received power (RSRP) change indicator.

10. The device of claim 9, wherein the RSRP change indicator indicates whether or not a RSRP of the current narrow beam is increasing.

11. The device of claim 8, wherein the processor is further configured to:
    obtain a new observation of the current state of communication in response to communicating with the UE using the selected next narrow beam; and
    update the statistical historical state information based on the new observation.

12. The device of claim 11, wherein to update the statistical historical state information based on the new observation, the processor is configured to at least one of:
    add a new data record to the statistical historical state information; and
    update an observation count of an existing record of the statistical historical state information.

13. The device of claim 8, wherein the one or more best next narrow beam candidates comprise one of:

a most frequent next narrow beam candidate;

a predetermined quantity of next narrow beam candidates; and multiple next narrow beam candidates having an accumulated probability that is equal to or greater than a threshold probability value.

14. A non-transitory computer readable medium comprising program code that, when executed by a processor of a device, causes the device to:

obtain information representing a current state of communication with a user equipment (UE) performed using one or more beams;

compare the information to statistical historical state information to determine one or more best next narrow beam candidates;

perform a beam search using the one or more best next narrow beam candidates in order to select a next narrow beam; and communicate with the UE using the selected next narrow beam, wherein the statistical historical state information comprises a current wide beam, a current narrow beam, and a previous narrow beam before the current narrow beam.

15. The non-transitory computer readable medium of claim 14, wherein the statistical historical state information further comprises a reference signal received power (RSRP) change indicator.

16. The non-transitory computer readable medium of claim 15, wherein the statistical historical state information further comprises:

multiple next narrow beam candidates; and an observation count corresponding to each of the multiple next narrow beam candidates.

17. The non-transitory computer readable medium of claim 14, wherein the RSRP change indicator indicates whether or not a RSRP of a current narrow beam is increasing.

18. The non-transitory computer readable medium of claim 14, wherein the program code further causes the device to:

obtain a new observation of the current state of communication in response to communicating with the UE using the selected next narrow beam; and update the statistical historical state information based on the new observation.

19. The non-transitory computer readable medium of claim 18, wherein the program code to update the statistical historical state information based on the new observation, further comprises program code to at least one of:

add a new data record to the statistical historical state information; and update an observation count of an existing record of the statistical historical state information.

20. The non-transitory computer readable medium of claim 14, wherein the one or more best next narrow beam candidates comprise one of:

a most frequent next narrow beam candidate;

a predetermined quantity of next narrow beam candidates; and multiple next narrow beam candidates having an accumulated probability that is equal to or greater than a threshold probability value.

* * * * *